United States Patent [19]

Kleven

[11] Patent Number: 5,003,295

[45] Date of Patent: Mar. 26, 1991

[54] ICE DETECTOR PROBE

[75] Inventor: Lowell A. Kleven, Eden Prairie, Minn.

[73] Assignee: Rosemount Inc., Eden Prairie, Minn.

[21] Appl. No.: 379,697

[22] Filed: Jul. 13, 1989

Related U.S. Application Data

[63] Continuation of Ser. No. 61,169, Jun. 10, 1987, abandoned.

[51] Int. Cl.$^5$ .............................................. G08B 19/02
[52] U.S. Cl. .................................. 340/581; 244/134 F
[58] Field of Search ............... 340/580, 581, 582, 962, 340/583; 244/134 R, 134 F; 73/170 R; 374/112, 113, 164

[56] References Cited

U.S. PATENT DOCUMENTS

| | | | |
|---|---|---|---|
| 2,766,619 | 10/1956 | Tribus et al. | 340/581 |
| 3,000,213 | 9/1961 | Eves et al. | 374/164 |
| 4,037,427 | 7/1977 | Kramer | 340/581 |
| 4,092,862 | 6/1978 | Taylor | 374/112 |
| 4,210,021 | 7/1980 | Vykhodtsev et al. | 340/580 |
| 4,333,004 | 6/1982 | Forgue et al. | 219/497 |
| 4,755,062 | 7/1988 | Meyer | 374/16 |

FOREIGN PATENT DOCUMENTS 2148514A 5/1985 United Kingdom.

Primary Examiner—Joseph A. Orsino
Assistant Examiner—Jeffery A. Hofsass
Attorney, Agent, or Firm—Kinney & Lange

[57] ABSTRACT

An ice detector probe senses an ice deposition from an air mass flowing relative to the probe. The probe includes a support for installation of the probe to receive the airflow and an element formed on a substrate having a sensing surface which directly receives the airflow. The element heats the sensing surface to melt an ice deposition formed thereon. The resistance element also senses the sensing surface temperature during heating and provides an output representative of such temperature.

6 Claims, 4 Drawing Sheets

ICE DETECTOR PROBE

This is a continuation of application Ser. No. 07/061,169, filed on June 10, 1987, abandoned.

CROSS-REFERENCE TO RELATED APPLICATION

Reference is hereby made to my co-pending U.S. patent application Ser. No. 061,168 entitled "Ice Detector Circuit" filed on even date herewith.

BACKGROUND OF THE INVENTION

Field of the Invention

The present invention relates to an ice detector probe for sensing an ice deposition from an air mass moving relative to the probe.

SUMMARY OF THE INVENTION

The present invention comprises an improved ice detector probe for sensing an ice deposition from an air mass moving relative to the probe. The probe includes mounting means for installation of the probe to receive a flow of the air mass, and thermal means disposed on the mounting means including a sensing surface. The thermal means include a thermal member which both heats the sensing surface and senses the temperature thereof. In one preferred embodiment the thermal member comprises a thin film resistance element which is disposed on a coupling surface of a protective member. The protective member comprises a substrate formed of substantially thermally conductive material which is further substantially impervious to the airflow. The side opposite of the protective member's coupling surface comprises the sensing surface which directly receives the airflow and thus protects the resistance element from direct impingement of the airflow.

In further preferred embodiments, mounting means are further improved to include insulating means for substantially insulating the thermal means from the mounting means, aerodynamic means for reducing an average recovery temperature of the sensing surface, retention means for retaining the ice deposition on the sensing surface during heating and melting thereof, and drainage means for removing a water layer which is formed between the sensing surface and the ice deposition during heating and melting thereof.

BRIEF DESCRIPTION OF THE DRAWINGS

FIG. 4 is a partial, elevational view of a portion of the ice detector probe which faces the air flow.

DETAILED DESCRIPTION OF THE PREFERRED EMBODIMENTS

Figure 1:
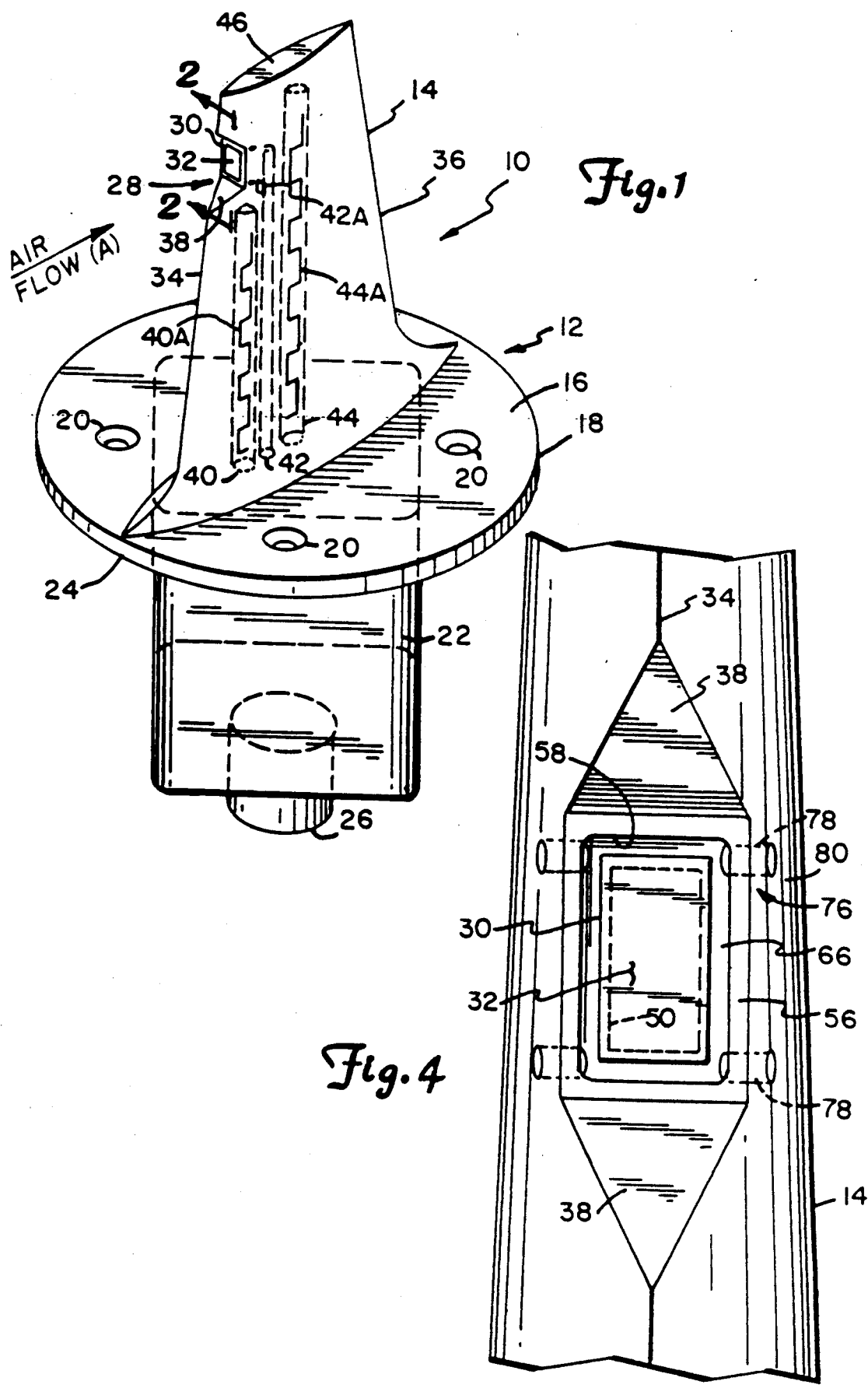
FIG. 1 is a perspective view of an ice detector probe in accordance with the present invention.

A preferred embodiment of the present invention is shown in FIG. 1, which depicts an improved ice detector probe generally at 10 for sensing an ice deposition from an air mass moving relative thereto. Shown generally at 12 are mounting means for moving or stationary installations, such as on air vehicles or antenna towers, for the probe 10 to receive a flow of the air mass. In the preferred embodiment, mounting means 12 comprise a strut 14 which extends generally perpendicularly from an upper side 16 of an integrally formed base plate 18, the base plate having a plurality of holes 20 to receive fasteners such as screws for mounting probe 10. A housing 22 for the probe's electronic circuitry, which is not shown, extends from a lower side 24 of base plate 18, and a connector 26 is provided on one side of housing 22 for making suitable electrical connection to probe 10. Thermal means generally shown at 28 comprise a thermal member 30 including a generally planar sensing surface 32 which is transversely disposed to the airflow, as depicted by arrow A, for heating sensing surface 32 and for sensing the temperature thereof.

The air mass which is in relative motion with respect to probe 10 can contain atmospheric moisture in a gaseous, liquid or solid state which can deposit to form ice on sensing surface 32 depending upon ambient meteorological conditions and various aerodynamic and thermodynamic conditions of sensing surface 32 and the air mass. During operation, thermal member 30 is subjected to the airflow and is selectively energized for heating the sensing surface 32 to melt ice which may have deposited thereon from the airflow. The thermal member 30 also senses the temperature of the sensing surface 32 while it is being heated and provides an output representative of such temperature to suitable electronic circuitry which can compute and provide an output representative of ice deposition as a function of the time rate of change of the thermal member output. One advantage of the present invention is that only one temperature sensor, i.e., thermal member 30, is required for sensing an ice deposition on the probe 10. No reference temperature sensor is needed since a rate of change of the sensing surface temperature can be determined by measurement of time intervals elapsed between preselected sensing surface temperatures. This simplifies the probe's construction, reduces the size, weight and cost of the probe, improves the performance and reliability of the probe, and renders the probe compatible with simple and low cost drive and sensing circuitry.

In aerospace applications, for example, where reduction of aerodynamic drag is highly desirable, the strut 14 can be formed as illustrated in FIG. 1 to have a generally biconvex shape having a tapered, leading edge 34 and a tapered, trailing edge 36, such that the leading edge 34 will be oriented to face into the oncoming airflow. The thermal member 30 is located in a notch 38 formed along the strut's leading edge 34 for protection of the thermal member 30 from damage caused by physical hazards such as hail, birds or airborne debris. The notch 38 is located a sufficient distance from base plate 18 such that the thermal member 30 is extended into the airflow having substantially free airstream characteristics.

Since an ice deposition on the strut 14 can undesirably obstruct a free flow of air to the thermal member 30 and increase strut drag, means for deicing the strut 14 preferably are provided. Strut deicing means can comprise, for example, electrical heating elements internally disposed in the strut 14, delivery of engine heated air to the strut 14, or other heating means as desired.

Figure 2:
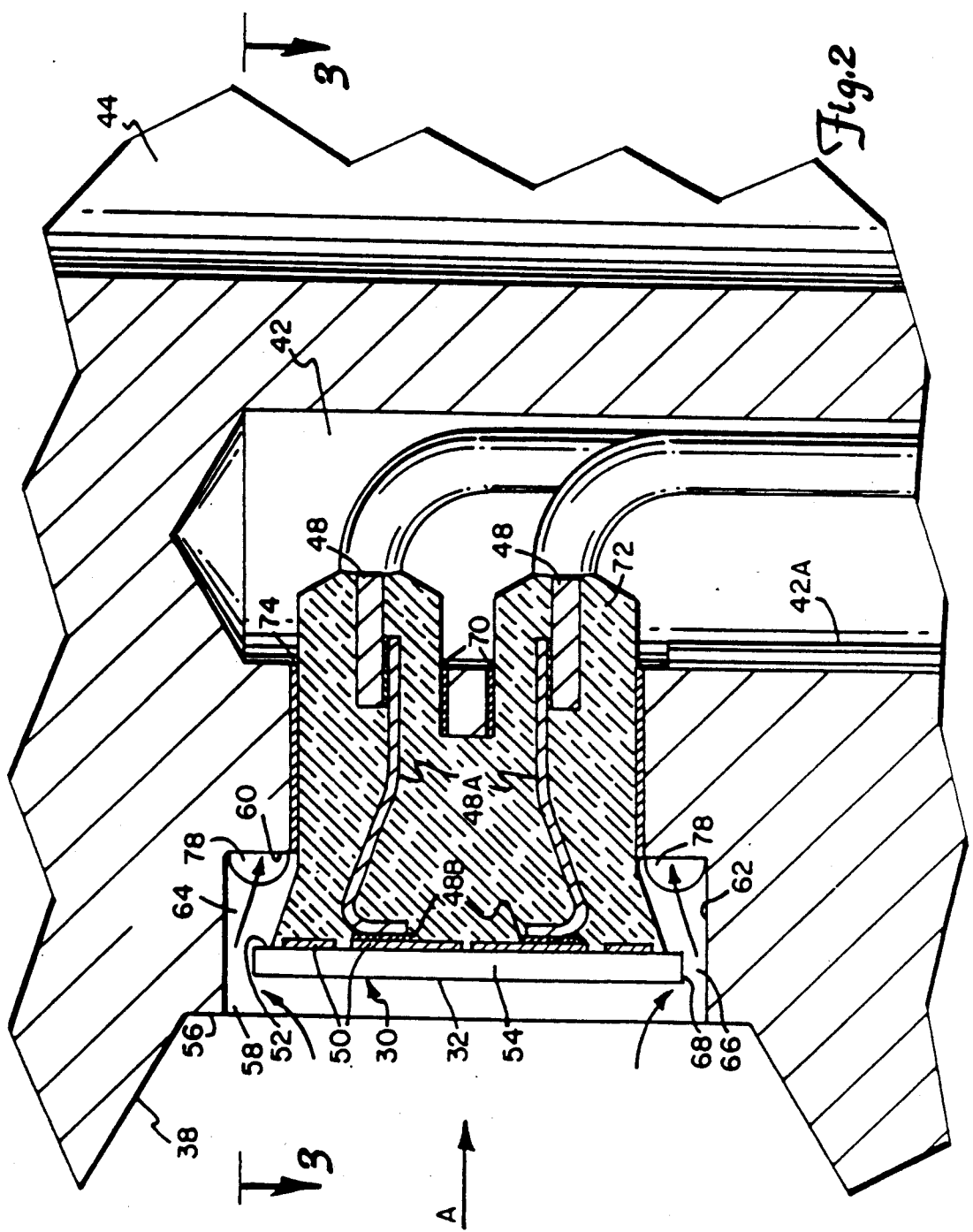
FIG. 2 is a partial, sectional view taken along line 2—2 of FIG. 1 of the ice detector probe.

In the preferred embodiment illustrated in FIG. 1, three spaced apart longitudinal bores 40, 42 and 44 are provided in strut 14 which extend through the base plate 18 into the strut. Bore 40 extends longitudinally within the forward portion of the strut 14 terminating slightly below thermal member 30, and a first electrical heating element 40A disposed in bore 40 provides deicing for the leading edge 34 and adjacent area of the strut. Bore 44 extends longitudinally within the central portion of the strut 14 terminating near a top end 46 of the strut, and a second electrical heating element 44A disposed in bore 44 provides deicing for the remainder of the strut. Strut 14 preferably is fabricated of material having a relatively high thermal conductivity such that the strut, when exposed to relatively severe icing conditions, can efficiently distribute the heat provided by the deicing means to keep the strut deiced. Bore 42 is located between bore 40 and 44 and extends longitudinally within strut 14 terminating behind the thermal member 30, and is used to provide a passageway for electrical leads 48 as shown in FIG. 2, from thermal member 30 to circuitry housing 22. A temperature sensor 42A can also be mounted in bore 42 which senses the temperature of strut 14 and provides an output which can be interactively utilized by the probe's electronic circuitry to selectively energize the strut deicing heater elements 40A and 44A as desired.

FIG. 2 shows in greater detail the mounting and electrical connection for thermal member 30 in accordance with a preferred embodiment of the invention. The thermal member 30 comprises a resistance element 50 which is formed on a coupling surface 52 of a generally flat protective member 54 made of material which is substantially thermally conductive and substantially impervious to the airflow, arrow A. The side opposite of the protective member's coupling surface 52 comprises the sensing surface 32 of thermal member 30. The thermal member 30 is disposed on strut 14 with the protective member's sensing surface 32 positioned upstream of the resistance element 50 to further protect the resistance element 50 from physical hazards and direct impingement of the airflow.

The protective member 54 can comprise a substrate having a coupling surface 52 which is substantially electrically insulating such that the resistance element 50 can be directly disposed thereon for improved thermal coupling with the sensing surface 32. The resistance element 50 can comprise a thin film or thick film resistance element preferably having material properties including chemical stability and a significant temperature coefficient of resistivity. Materials for fabrication of the thermal member 30 can comprise, for example, a substrate formed of aluminum oxide, beryllium oxide or quartz and a resistance element formed of platinum, nickel or doped silicon.

While it is possible for the means for heating the sensing surface 32 to be physically separate from the means for sensing the temperature thereof, a self-heating temperature sensor is preferred, i.e., a sensor having dual functions of heating and temperature sensing. Use, for example, of a self-heating, thin film platinum resistance thermometer as the ice detector probe's thermal member 30 provides many advantages. The thermal member 30 can be easily fabricated on a batch fabrication basis by microstructure fabrication techniques generally similar to those used in the semiconductor industry. Due to the small physical dimensions to which such a micro-fabricated device can be made, its correspondingly small mass is subject to rapid thermal changes, thus providing an ice detector probe 10 having fast thermal response. Since the thermal member 30 can be made relatively small, the overall probe's size can be reduced such that its use in aerospace applications can advantageously reduce the probe's aerodynamic drag and radar reflectivity. Also, such micro-fabricated devices offer much greater flexibility in configuration of the resistance element, and precise trimming of the resistance values is possible using, for example, laser trimming techniques. Additionally, such micro-fabricated devices can be made at low cost, and are compatible with simple and low cost drive and sensing circuitry.

Recessed within a forward face 56 of notch 38, an opening 58 is formed in strut 14 which extends inwardly from the forward face 56 to a back wall 60. A side wall 62 which forms opening 58 extends outwardly from the back wall 60 to define a forwardly open receiving chamber 64 in which thermal member 30 is mounted. The receiving chamber 64 is preferably slightly larger than the outside dimensions of thermal member 30 such that an annular gap 66 is formed between the side wall 62 and the peripheral edges 68 of thermal member 30 when mounted in the chamber. Passageways 70 which interconnect receiving chamber 64 with longitudinal bore 42 are provided in strut 14 through which electrical interconnection between thermal member 30 and the circuitry's electrical leads 48 can be made. Bond wires 48A are used to interconnect electrical leads 48 with contact pads 48B provided on the thermal member's resistance element 50.

Since deicing the strut 14 can introduce undesired thermal effects which could adversely influence the thermal member's signal, insulating means for thermally decoupling thermal member 30 from strut 14 are desirable. Such insulating means can comprise an insulating connector 72 which is interposed between thermal member 30 and strut 14 and is comprised of material which is substantially thermally nonconductive. The insulating connector 72 is formed to closely fit into passageways 68 where it can be retained by a suitable adhesive 74. The material from which insulating connector 72 is formed is also preferably substantially electrically nonconductive, such that connector 72 can be directly affixed to resistance element 50, partially exposed electrical leads 48 and bond wires 48A which interconnect with thermal member 30, without significantly affecting an electrical signal carried by the leads 48, bond wires 48A or resistance element 50.

It is known that the aerodynamics of a surface moving relative to an air mass can affect the formation of ice thereon. In the preferred embodiment, for example, the probe's sensing surface 32 is generally flat and transversely disposed with respect to the airflow. While other configurations, such as a contoured surface, could be used, a generally flat, transversely disposed surface is preferred since it provides for an efficient collection on the sensing surface 32 of moisture carried in the airflow and promotes ice deposition at relatively moderate airflow velocities. In aerospace applications, however, where relatively high airflow velocities can be expected during flight, a flat, transversely disposed surface can also produce other aerodynamic affects, such as adiabatic heating of the surface and boundary layer air formation thereon, which can undesirably retard ice deposition on the sensing surface 32. As high velocity airflow impacts against the probe's sensing surface 32, the surface can become adiabatically heated due to fluid friction and compression effects as the flow of the air mass is slowed by the sensing surface 32. The average recovery temperature of the flat sensing surface 32 can thus become undesirably elevated above that of other contoured surfaces of an aircraft which are exposed to the airflow, such as wings, propellers, or engine air inlets, and result in dangerous flight conditions where undetected icing on such other surfaces of the aircraft occurs prior to that on the probe's sensing surface.

Figure 3:
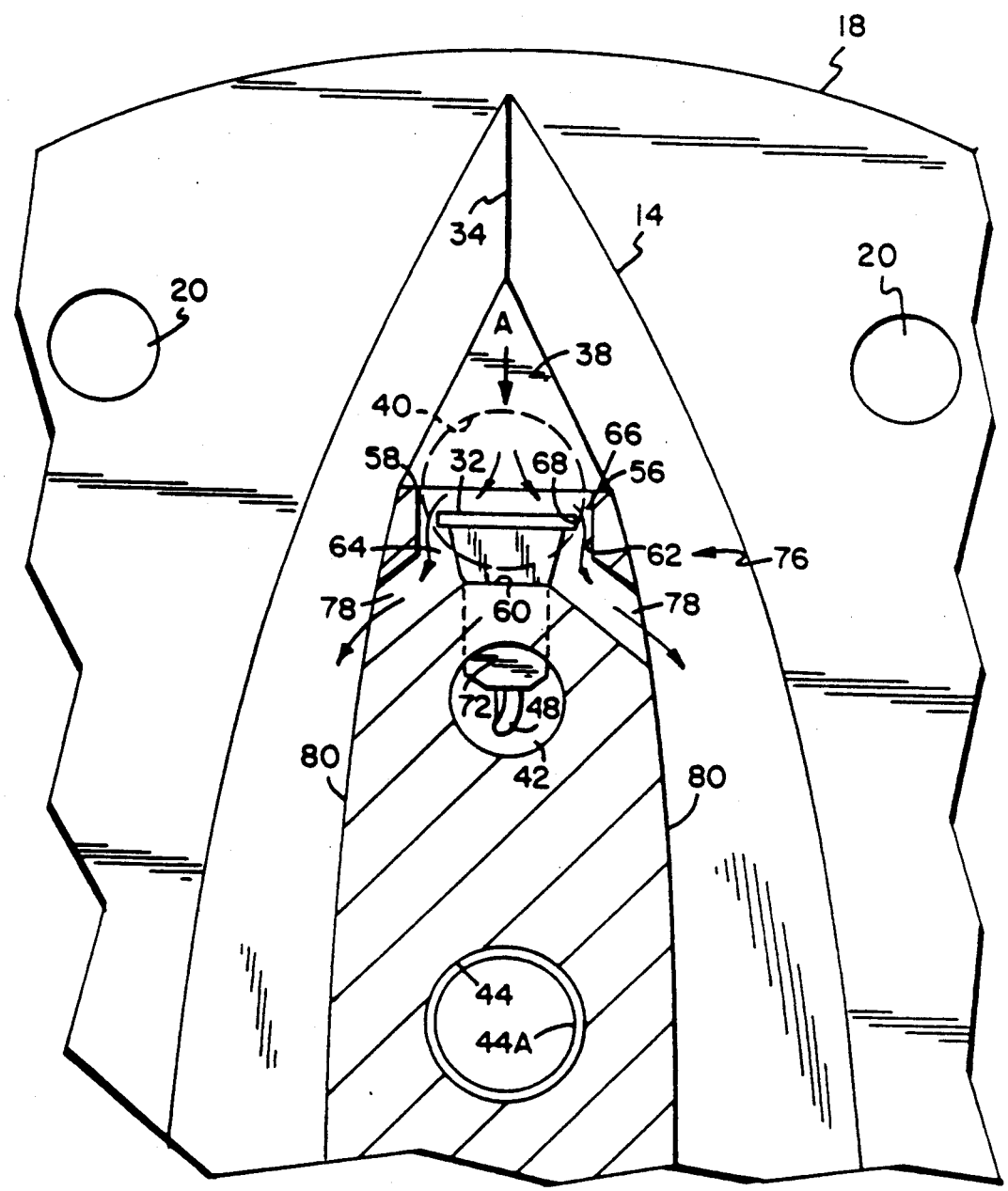
FIG. 3 is a partial, sectional view taken along line 3—3 of FIG. 2 of the ice detector probe.

Accordingly, in the present invention aerodynamic means are included, as best illustrated in FIGS. 3 and 4 shown generally at 76, for reducing the average recovery temperature of the probe's sensing surface 32. Aerodynamic means 76 comprise the annular gap 66 around the thermal member's peripheral edges 68, and a plurality of drainage ducts 78 each of which extend from the receiving chamber's back wall 60 out to an adjacent biconvex side 80 of strut 14. Due to the pressure differential between an impact pressure formed along the sensing surface 32 by the impacting airflow, arrow A, and a lower, static pressure existing along the biconvex sides 80 adjacent the drainage ducts 78, the airflow passes through annular gap 66, receiving chamber 64, and exits through drainage ducts 78 out to the region of lower pressure. As the airflow passes through the relatively narrow annular gap 66, its velocity is increased and an adiabatically induced temperature and pressure reduction in the accelerated airflow occurs. Due to the high convective heat loss which occurs as the accelerated airflow passes by the thermal member's peripheral edges 68, the average recovery temperature on the sensing surface 32 is reduced. Consequently, the flat, transversely-mounted sensing surface 32 provides a surface having relatively high moisture collection efficiency, while the aerodynamic means 76 also function to reduce the average recovery temperature thereof, such that ice deposition on the sensing surface 32 is representative of that which can occur on other surfaces of the installation which are exposed to the airflow.

As an ice deposition which has formed on the sensing surface 32 is heated during operation of the probe 10, a water layer will form between the sensing surface 32 and that portion of the ice deposition adjacent thereto. Since the water layer is a relatively poor thermal conductor which introduces an increased temperature gradient between the sensing surface 32 and ice deposition at increased thickness and impedes heat transfer therebetween, it is desirable that the water layer thickness be reduced during the heating period. Consequently, the annular gap 66 and drainage ducts 78 further function to reduce the water layer thickness, or at least prevent an inordinate increase thereof, by draining this water layer away from thermal member 30. As the oncoming airflow impacts against the ice deposition, the resulting impact pressure acts to squeeze the water layer out from between the ice deposition and sensing surface 32, where it then is picked up by the airflow passing around the thermal member's peripheral edges 68 to be discharged out the drainage ducts 78 provided in heated strut 14. The receiving chamber's side wall 62 which projects slightly forward of the thermal member's sensing surface 32, together with the impact pressure and the airflow through the annular gap 66 around the ice deposition, cooperate to retain the ice deposition against thermal member 30 while the ice is being heated and melted so that the ice deposition can be sensed. Additionally, aerodynamic means further function to provide a self-cleaning flow of air and moisture over the probe's sensing surface 32 for removal of contaminants which can undesirably affect the rate of temperature change sensed.

Figure 5:
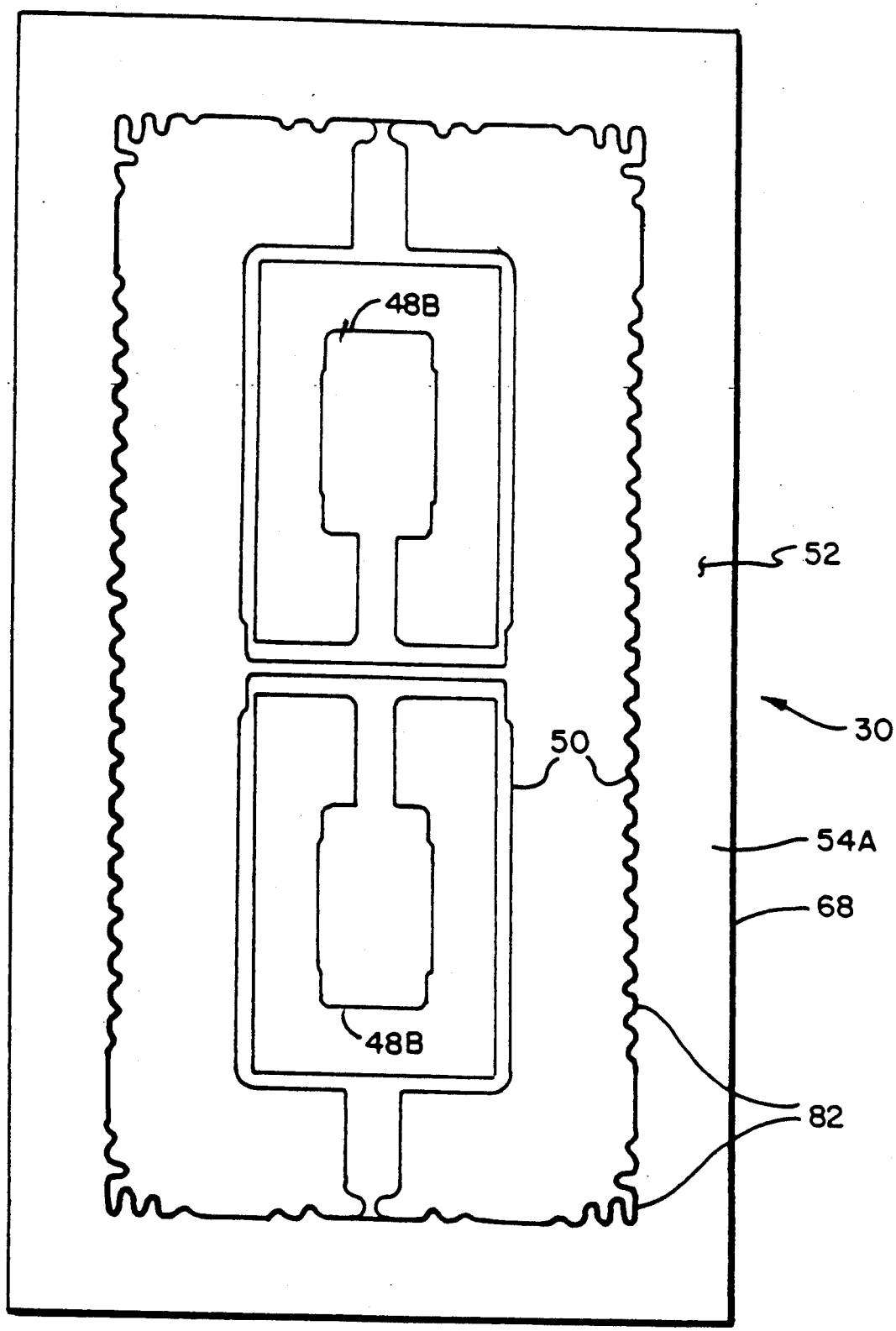
FIG. 5 is a plan view showing one embodiment of a resistance element used in the ice detector probe.

FIG. 5 is a plan view showing one embodiment of a thermal member 30 used in the ice detector probe 10, comprising a resistance element 50 formed on a substrate 54A by microstructure fabrication techniques similar to those used in the manufacture of integrated circuits. This illustrates only one of many different configurations of resistance element 50 which can be used, depending upon the resistance value desired and other considerations such as the thermal characteristics of the particular substrate being used and the particular intended application for probe 10. The resistance element's configuration is preferably symmetrical and can include a serpentine pattern 82, such as that shown adjacent thermal member's peripheral edges 68, such that heating of the substrate sensing surface 32 which is exposed to the airflow will be substantially uniform for melting an ice deposition thereon and a temperature which is representative of the temperature on the sensing surface 32 will be sensed.

Although the present invention has been described with reference to preferred embodiments, workers skilled in the art will recognize the changes may be made in form and detail without departing from the spirit and scope of the invention.

I claim:

1. An ice detector probe receiving selective energization for sensing ice deposition from an air mass moving relative to and impinging upon the probe comprising:
  mounting means for installation of the probe to receive a flow of the air mass;
  thermal means disposed on the mounting means,
  the thermal means including a sensing surface oriented to receive impingement of the air mass and having a thermal member receiving the selective energization for heating the sensing surface and for also sensing a temperature of the sensing surface, the thermal member further providing an output representative of the temperature of the sensing surface sensed by the thermal member during the time the selective energization of the thermal member is operative to heat the sensing surface to melt ice, the output representative of the temperature sensed indicating the ice deposition; and
  wherein said thermal member comprises a protective member having a thin film platinum resistance thermometer deposited on the protective member in a batch fabrication process.

2. The ice detector probe of claim 1 wherein the mounting means include aerodynamic means for reducing an average recovery temperature of the sensing surface.

3. The ice detector probe of claim 1 wherein the mounting means include retention means for retaining the ice deposition on the sensing surface during heating by the thermal means.

4. The ice detector probe of claim 1 wherein the mounting means include drainage means for removing a water layer which is formed between the sensing surface and the ice deposition during heating of the sensing surface.

5. An ice detector probe receiving selective energization for sensing ice deposition from an air mass moving relative thereto, the ice detector probe comprising:
  mounting means for supporting the ice detector probe in a moving air mass; a thermal member supported by the mounting means in a moving air mass, the thermal member comprising:

a protective member having a sensing surface oriented to face into the moving air mass, and means coupled to the protective member and receiving the selective energization for heating the protective member and for providing an output representative of the temperature sensed while the selective energization heats the protective member, the output indicating the ice deposition;

means on the mounting means for reducing the average recovery temperature of the sensing surface; and wherein said thermal member comprises said protective member formed of a material compatible with the thin film platinum resistance thermometer, said platinum resistance thermometer being deposited on a surface of the protective member facing oppositely to the sensing surface.

6. An ice detector probe receiving selective energization for sensing ice deposition from an air mass moving relative thereto, the ice detector probe comprising:

a thermally conductive strut for support of the ice detector probe in the moving air mass comprising a base plate, a biconvex portion extending vertically from the base plate, a tapered leading edge to the biconvex portion, means for heating the strut, a notch in the tapered leading edge spaced from the base plate surrounding a forwardly oriented opening recessed within the strut;

a thermal member disposed in the opening where it is protected from airborne debris, the thermal member having outside dimensions smaller than the opening thereby creating an annular gap between the thermal member and the opening, the thermal member comprising a protective member having a sensing surface oriented generally transverse to the air flow to face outwardly from the opening, and means coupled to the protective member and receiving the selective energization for heating the protective member and for providing an output representative of the temperature sensed while the selective energization heats the protective member, the output indicating the occurrence of ice deposition;

drainage ducts formed in the strut extending from the annular gap out to an adjacent side of the strut to remove water from the receiving chamber; and an insulating layer supporting the thermal member within the strut and electrically and thermally decoupling the thermal member from the strut.

* * * * *